United States Patent Office 3,459,709
Patented Aug. 5, 1969

3,459,709
METHOD OF STABILIZING POLYOXYMETHYLENES
Jacob Ackermann and Pierino Radici, Milan, Italy, assignors to Società Italiana Resine S.p.A., Milan, Italy
No Drawing. Filed June 20, 1966, Ser. No. 558,624
Claims priority, application Italy, July 2, 1965, 15,394/65
Int. Cl. C08g 1/24, 51/58
U.S. Cl. 260—67           1 Claim

ABSTRACT OF THE DISCLOSURE

A process for heat stabilizing polyoxymethylene whereby the polymer is esterified with a suitable esterification agent such as acetic anhydride, while in contact with a chain stabilizing agent having at least one element of Group V of the Periodic Table of Elements, such as polylactam, triorgano phosphine, triorgano stibine, triorgano arsine or the quaternary salts of ammonium and phosphonium. A heat stabilized polyoxymethylene resulting from the foregoing method.

---

This invention relates to the preparation of a stable, easily workable, colorless polyformaldehyde by substitution of ester groups, more particularly acetate groups for the terminal hydroxyl groups.

It is known that formaldehyde or its cyclic trimer can be converted by polymerization to polyformaldehyde or macromolecular polyoxymethylene.

The raw polymer, obtained by polymerization of formaldehyde or its cyclic trimer normally contains one hydroxyl group at least to each macromolecule, which makes the product thermally unstable. In order to avoid depolymerization the hydroxyl groups at chain terminals can be replaced by ester groups, ether groups or groups having a link

Esterification of the hydroxyl groups by acetic anhydride is one of the best known methods for the purpose and was described by Staudinger in 1925.

Staudinger ascertained the necessity of operating in the presence of a basic catalyst such as pyridine. Further proposed catalysts are the alkali salts of carboxylic acids, which are efficient in a lower proportion as compared with the amines used by Staudinger.

The catalysts are intended above all to accelerate esterification and afford a higher yield of esterified polymer.

While effecting esterification in the above-mentioned manner the thermal stability of polyformaldehyde is improved, the processes carried out in the presence of said catalysts are not fully satisfactory. The esterified products obtained consistently contain a considerable quantity of products which are unstable at the working temperature (extrusion and molding); this necessitates further expensive treatments in order to eliminate the unstable portion, and lowers the useful product yield. On the other hand, both the polymer and reagents become coloured during reaction. The polymers obtained are yellowish to brown after melting and molding.

The excess reagent used is lost in considerable quantities in the make-up owing to strongly coloured secondary products which are formed in the presence of the above-mentioned catalysts.

A further complication of the esterifying process in the presence of a catalyst, more particularly alkali salts of carboxylic acids, is the necessity for the latter to be fully removed from the polymer after reaction by repeated, lengthy and expensive washing.

It has been found that a catalyst, such as sodium acetate, when even in trace amounts only, that is to say, in much lower quantities than necessary during reaction, leads to both strong colouration and decay of the polyformaldehyde during processing at high temperature.

Attempts at effecting esterification in the absence of a catalyst in order to remove the above-mentioned drawbacks have shown that it is possible to accelerate the acetylation rate by working in a homogeneous phase at a temperature exceeding 140° C., thereby obtaining a relatively high yield. However, the molecular weight of the polymer obtained is thereby strongly reduced with respect to the molecular weight of the non-esterified starting product.

This reduction in molecular weight has not been thoroughly explained heretofore; possibly, the small quantities of free acid consistently present in the anhydride of the carboxylic acid effect splitting of the macromolecular chains in the manner symbolized by the following reaction:

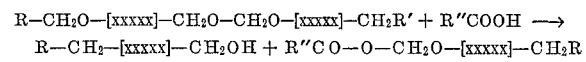

wherein:

[xxxxx]: symbol for the macromolecular chain
R, R': terminal groups of the original macromolecular chain, for instance —OH, —OCOR', —OR"
R": alkyl radical, for instance —CH₃, —C₂H₅

We have now found an esterifying process, more particularly an acetylation process of macromolecular polyoxymethylenes which may be utilized as plastics, apt to avoid the above-described drawbacks of the methods according to the prior art by operating in the presence of small quantities of substances which shall be referred to hereafter as additives. These additives are more particularly efficient in protecting the macromolecular chain against separation during esterification. Further advantages shall be described hereafter. The additives, which comprise organic substances containing one element at least of the V Group of the periodic system can be subdivided into two classes as follows:

Class A: amides of mono- or polybasic acids, either substituted or non-substituted; polyamides; poly-N-vinyl-lactams; urea; thiourea and polyurea; polyisocyanates and organic anion exchangers.

Class B: organic compounds of the elements included in Group Vb of the periodic system of elements, more particularly triorgano phosphines, triorgano stibines and triorgano arsines and quaternary salts of ammonium and phosphonium.

As examples of Class A the following may be cited: N,N dimethylcaprilamide; N,N' dimiristyl - hexamethylene-diamide; polycaprolactam; polyamide composed of polycaprolactam, polyhexamethylene adipamide and polyhexamethylenesebacamide; polyvinylpyrrolidone; urea; dibutyl-ethyleneureau; thiourea and high molecular weight polymer obtained by polymerization of n-butylisocyanate of the following formula:

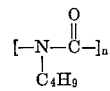

Examples of class B are as follows: the product of quaternization obtained from triphenylphosphine and p-quinone; triphenyl - phosphine; tetra-n-butyl-ammonium laurate; dimethyl - dioctadecyl - ammonium acetate and dimethyl-dihexadecyl-ammonium chloride.

The process of the invention permits to obtain noncoloured esterified polyformaldehyde which is highly stable at its processing temperature. The esterified producduct yield with respect to the starting product exceeds 90%. By starting product the raw polyoxymethylene is understood, having one hydoxyl group at least to each macromolecule. The molecular weight and properties determined by the molecular weight, such as viscosity in solution or melt index are left substantially unaltered. Wherever necessary, however, a controlled decrease in molecular weight can be obtained without affecting yield.

The additives according to this invention can be utilized with any esterifying agent, preferably in the absence of esterifying catalysts.

The preferred esterifying agent is acetic anhydride. The weight ratio of the agent and polymer is not critical. However, an excess agent is advisable. The ratio can range from about 0.1:1 to 50:1, preferably from 0.5:1 to 20:1. The quantity of additive with respect to the esterifying agent depends above all on the purity of the agent and on whether a decrease in molecular weight during the process is desired or not.

A further feature of this process is that a much smaller quantity of additive is generally sufficient with respect to its chemical equivalent both with regard to the esterifying agent and free acid present.

The quantity of additives of class A can range between about 0.05 and 10% and the quantity of additives of class B can range between 0.001 and 10% with respect to the esterifying agent.

The esterification temperature preferably ranges between 140° C and 180° C. The purity of the esterifying agent is preferably rather high. However, particular or expensive purifying efforts are not required. The free acid should not exceed 5% and is preferably less than 1%.

A typical embodiment of the process according to this invention compirses the steps of mixing raw polyoxymethylene with about 6 parts by weight of acetic anhydride containing the additive, heating the mixture while stirring till the polymer is dissolved, maintaining the polymer in a dissolved condition till thorough esterification, and precipitating the acetylated polymer by cooling the solution. Normally acetylation is completed after about 20 minutes; however, the necessary reaction period may vary depending upon the type of polymer, temperature, molecular weight, etc.

The excess acetic anhydride can easily be recovered by filtering; its contents retained by the polymer after filtering can be recovered by drying in vacum and condensation of the vapors or by washing by means of an organic solvent which is inert towards the acetic anhydride or by any other type of a similar process. It is advisable to employ an organic solvent lower in boiling point than acetic anhydride, in order to dry the polymer at low temperature and separate the solvent and anhydride simply by rectification.

In this manner both the excess acetic anhydride and washing solvent can be recovered and recycled almost quantitatively.

The esterified polymer is obtained and recovered by a quantity exceeding 90%; it exhibits an unaltered molecular weight (but for the difference explained hereafter) and a high stability at the operating temperature.

Articles molded from such polymer are substantially white.

If esterification is carried out in the same manner and with the same starting product as described above, but in the absence of the additives according to this invention, a polymer is obtained with a yield below 90% and the molecular weight of the esterification product is considerably lowered, so that the product can no longer be used for manufacturing molded articles of high technological properties.

If esterification is carried out in the same manner and with the same starting material as described above, but in the presence of sodium acetate which is a typical catalyst of the prior art, the yield of recoverable polymer and the molecular weight are substantially similar to those of the process according to this invention; however, stability at processing temperature is considerably lower and the molded articles are coloured brown or brown-black.

A certain improvement can be obtained if the catalyst employed is separated from the polymer by a large number of washing steps carried out by means of solvents for the catalyst. However, notwithstanding the additional washing steps, the polymer is always lower in stability than by the process according to this invention; moreover the products sharply tend to become coloured yellow or brown in the melting processes necessary for technological uses.

A further feature of the additives of this invention is that removal thereof after esterification is not necessary, because of the absence of negative effects on the properties of the polymer. They rather exhibit a stabilizing action with time.

The function of the additives according to this invention is surprising. The substances of class A were known as agents absorbing monomeric formaldehyde by a chemical reaction and were as such utilized in part as stabilizers during processing in a molten condition of the polymer in the presence of oxygen.

Their function according to this invention is of another kind, firstly because oxygen is not present and, secondly, because absorption of monomeric formaldehyde, which constantly forms in small quantities at the start of esterification, would prevent their activity for the purposes of this invention. The action of the additives within the scope of this invention is consequently different. This is evidenced more clearly by the fact that the additives of class B are of an activity, for the purposes of this invention, similar to those of class A though they are incapable of absorbing monomeric formaldehyde.

Certain members of class B were proposed as initiators of polymerization at low temperature of monomeric anhydrous formaldehyde dispersed in an inert solvent.

However, it is generally known and reported in literature relating to formaldehyde polymers that the polymerization initiators should be carefully removed on completion of polymerization, that is before the further processing at high temperature, because any residues of the initiator would act to decay the polymer.

In contrast thereto, this invention is based on the discovery that the said substances, known in part as polymerization initiators, can under certain conditions, even at high temperature, exert a protecting action on the macromolecular chain, against expectations from the prior knowledge.

EXAMPLES 1–4

The raw polyformaldehyde utilized for esterification in these examples was obtained by dispersion polymerization of monomeric formaldehyde, in an essentially anhydrous state, in an inert solvent and in the presence of an anionic initiator. The monomeric formaldehyde can be easily prepared, such as by the method according to U.S. Patents Nos. 3,118,747 and 3,184,900.

The polymer so obtained in suspension was filtered, washed and dried in an air oven at 90° C. before esterification.

The raw polyoxymethylene was of an inherent viscosity of 1.7 (determined at 60° C., in a 0.5% solution in p-chlorophenol containing 2% alpha-pinene, with a viscosimeter of the Ostwald type).

The concentration of the terminal hydroxyl groups, calculated as —$CH_2OH$ and determined by infrared rays (absorption band at a wavelength of 3450 cm.$^{-1}$) was 0.16%.

A suspension is prepared comprising 9 parts acetic anhydride containing 0.3% acetic acid and 1 part pulverized polymer according to this invention. This suspension is utilized for the esterification tests both in the presence of the additives of this invention, in the presence of a previously known catalyst and without any addition of additives or catalysts.

The acetylation apparatus is a multiple neck flask provided with an anchor stirrer, a thermometer, a cooler and a free neck for the addition of products. The flask is immersed into a heating bath. A pressure regulator is connected to the top of the cooler for adjusting absolute pressure in the flask between about 2 kg./sq. cm. and 0.1 kg./sq. cm.

The apparatus is fully pressure-tight. 350 ml. suspension and the various additives, respectively, as indicated in Table I, are poured into the flask. After the pressure in the flask has been brought to 1.65 kg./sq. cm. by means of nitrogen, the flask is immersed into the heating bath which is already at the necessary temperature. Within a few minutes the contents start boiling with reflux, the polymer being dissolved. The temperature of the solution is stabilized at about 155° C. The pressure is kept constant at 1.65 kg./sq. cm. Forty minutes after dissolving has been completed the heating bath is removed and the pressure in the flask is brought to 0.7 kg./sq. cm. in order to precipitate the polymer. After further cooling to 20° C. the product is filtered, washed with toluene in order to remove acetic anhydride, dried at 105° C. and weighed. The acetylated product in the presence of sodium acetate has been washed five further times with hot water in order to remove the catalyst as far as possible.

TABLE I

| Ex. | Substances added to suspension (gr. to 100 gr. polymer) | Recovered polymer, percent by weight | Inherent viscosity | Stability index | Colour |
|---|---|---|---|---|---|
| 1 | None | 75 | 0.80 | 7 | White. |
| 2 | 0.05 dimethylphosphine. | 94 | 1.65 | 3 | Do. |
| 3 | 0.04 dimethyldioctadecylammonium chloride. | 95 | 1.67 | 4 | Do. |
| 4 | 0.07 sodium acetate | 94 | 1.64 | 12 | Brown-yellow. |

The index of stability is expressed as the percentage by weight of the polymer decayed and volatilized from a sample of 100 mg. dry polymer held during one hour at 220° C. in a nitrogen environment.

The improved thermal stability of the polymers obtained by the process according to this invention becomes even more apparent on considering the index of stability of the polymer which was first heated during 30 minutes at 200° C. without considering the loss during this period; under such conditions, while the polymers of the Examples 2 and 3 exhibit an index of stability lower than 1, the polymer of the Example 4 exhibits an index of stability of 8.

The colour of the products indicated in Table I was ascertained after injection-molding. All the polymers examined at infrared rays exhibit the absence of groups —CH$_2$OH (at 3450 cm.$^{-1}$) and the presence of a band at about 1750 cm.$^{-1}$ denoting the acetate groups.

EXAMPLES 5–12

A plurality of acetylations in the presence of certain additives of class A of this invention, carried out by way of comparison, in the presence of additives known from the prior art and, lastly, without additives, were carried out in the same manner as described in Examples 1 to 4. The suspension of raw polyoxymethylene was prepared in the acetylation apparatus direct.

The raw polymer was obtained in a similar manner as indicated in Examples 1 to 4 but the inherent viscosity is 1.5 The weight ratio of the dry polymer and acetic anhydride is 1:7. The free acetic acid contained in the acetic anhydride is about 0.15%. The pressure during acetylation is 1.25 kg./sq. cm., the temperature being stabilized at about 146° C. The polymer is maintained in dissolved condition during 30 minutes and is thereafter precipitated as described, filtered, washed with toluene and dried. Finally, the polymer is admixed with 0.8% by weight of 4,4'-butylene-bis (6-tert.butyl-m-cresol) as antioxidant.

The melt index, which is an indirect measure of the molecular weight and gives the fluidity of the polymer in molten condition, was determined at 195° C.

The lower the melt index, the higher the molecular weight.

The apparatus and method are in agreement with the specification of ASTM D1238–57T. (Weight=2.16 kg.).

TABLE II

| Ex. | Substances added to the anhydride (gr./100 ml. anhydride) | Melt index, gr./10 min. | Index of stability, percent | Color |
|---|---|---|---|---|
| 5 | None | >50 | 6 | White. |
| 6 | 0.07 polyamide (terpolymer composed of polycaprolactam, polyhexamethylenesebacamide, polyhexahexamethyleneadipamide). | 15 | 2 | Do. |
| 7 | 0.07 polyvinylpyrrolidone. | 13 | 2 | Do. |
| 8 | 0.18 N,N' dimyristylhexamethylenediamide. | 18 | 3 | Do. |
| 9 | 0.3 N,N' dimethylcaprylamide. | 17 | 3 | Do. |
| 10 | 0.08 urea | 35 | 5 | Do. |
| 11 | 2 phenylisocyanate | 40 | 20 | White-yellow. |
| 12 | 0.2 pyridine | 14 | 7 | Dark-brown. |

EXAMPLES 13–16

The acetylations are carried out in a manner similar to the preceding examples. The anhydride is of variable quality in respect of the free acetic acid contents. The polyoxymethylene employed is the same throughout the tests. The composition of the anhydride, the additives used and the results are summarized in Table III.

The weight ratio of polymer and anhydride is 1:5. The acetylation temperature is 150° C. and the period during which the polymer is maintained in dissolved condition is 20 minutes.

TABLE III

| Ex. | Additives (gr./100 ml. anhydride) | Percent free acetic acid | Recovered polymer, percent | Melt index, gr./10 min. | Index of stability |
|---|---|---|---|---|---|
| 13 | None | 0.2 | 80 | 40 | 6 |
| 14 | do | 1.0 | 55 | >100 | 12 |
| 15 | 0.04 triphenylphosphine. | 0.2 | 95 | 10 | 2 |
| 16 | 0.1 dimethyldidodecylammonium acetate. | 1.0 | 92 | 12 | 3 |

EXAMPLE 17

A polyoxymethylene was employed which had been obtained similarly as described is Examples 1 to 4, of an inherent viscosity of 2.5.

Experience has shown that this viscosity corresponds to a melt index lower than 1. Technically the melt index values lower than 1 are hardly of interest, because very high viscosity leads to difficulties in processing.

In order to convert this polymer to one of a technically more interesting melt index value (about 5) the polymer was acetylated in the manner described in the preceding examples, but the period of dissolution was varied.

TABLE IV

| Reaction time (dissolution) minutes | Melt index | |
|---|---|---|
| | No additive | 0.02 gr. N,N' diethyladipamide, 0.005 gr. triphenylphosphine to 100 ml. acetic anhydride |
| 5 | 15 | 0.8 |
| 10 | 28 | 1.8 |
| 20 | >50 | 4.5 |
| 40 | | 7.0 |

The index of stability after 5 minutes dissolution was 20 in the tests with no additives and 8 in the tests with an additive.

After 20 minutes dissolution the values of the index of stability were 8 and 3, respectively, and the polymer yields 72% and 94%.

By employing a suitable quantity of additives according to this invention the polymer of an excessively low melt index in view of technological requirements can be converted to one of a higher melt index, which is more desirable.

Without employing additives products are obtained which are either of a normal melt index but of an unsatisfactory thermal stability or of an improved thermal stability but of an excessively high melt index.

EXAMPLE 18

Acetylation was carried out in the apparatus described in Examples 1 to 4.

The difference to the preceding tests is that the polymer is not fully dissolved on account of the use of a smaller excess of reagent.

The polymer is mixed with acetic anhydride containing 0.05 gr./100 ml. dimethyl-dioctadecyl-ammonium chloride and 0.2 gr./100 ml. polyvinyl pyrrolidone to obtain a weight ratio of polymer to anhydride of 1:0.8.

The mixture, which looks like a powder even after impregnation with anhydride is heated while stirring to 162° C.

The pressure is 2 kg.sq. cm. After 50 minutes the bath is cooled to 100° C. and pressure reduced to 0.1 kg./sq. cm. in order to evaporate the excess anhydride. A stable white polyformaldehyde powder is obtained.

The inherent viscosity is 1.45 and is practically unaltered with respect to the starting product.

The polymer is recovered by 96%. The index of stability thereof is 4.

By carrying out acetylation under the same conditions and with the same starting product, in the absence of additives, only 82% polymer can be recovered; the viscosity is 1.1 and the index of stability is 9.

What we claim is:

1. A process for heat stabilizing polyoxymethylene containing at least one terminal hydroxy group which comprises esterifying the hydroxy group of said polyoxymethylene with a suitable esterification agent while in cantact with a stabilizing amount of less than 10% by weight of the esterifying agent of a chain stabilizer selected from the group consisting of t-n-butyl ammonium laurate, dimethyl-dioctadecyl-ammonium acetate and dimethyl-dihexadecyl ammonium chloride.

References Cited

UNITED STATES PATENTS

| | | | |
|---|---|---|---|
| 2,828,286 | 3/1958 | MacDonald | 260—67 |
| 2,844,561 | 7/1958 | Bechtold et al. | 260—67 XR |
| 2,964,500 | 12/1960 | Jenkins et al. | 260—67 |
| 2,994,687 | 8/1961 | Goodman et al. | 260—67 |
| 3,351,614 | 11/1967 | Fiore et al. | 260—67 |
| 3,204,014 | 8/1965 | Green | 260—895 |
| 3,248,362 | 4/1966 | Perry | 260—45.7 |
| 3,355,514 | 11/1967 | Van De Walle et al. | 260—857 |

WILLIAM H. SHORT, Primary Examiner

L. M. PHYNES, Assistant Examiner

U.S. Cl. X.R.

260—18, 45, 857